US012749225B2

(12) United States Patent
Madani et al.

(10) Patent No.: US 12,749,225 B2
(45) Date of Patent: Sep. 29, 2026

(54) METHODS AND APPARATUS FOR OPERATION AND NAVIGATION OF AGENTS IN GLOBAL POSITIONING SYSTEM (GPS) DENIED ENVIRONMENTS

(71) Applicant: Rivet Industries, Inc., Washington, DC (US)

(72) Inventors: Seyedsohrab Madani, Menlo Park, CA (US); Jouya Jadidian, Los Gatos, CA (US); Mohit Narang, Cupertino, CA (US)

(73) Assignee: Rivet Industries, Inc., Washington, DC (US)

( * ) Notice: Subject to any disclaimer, the term of this patent is extended or adjusted under 35 U.S.C. 154(b) by 0 days.

(21) Appl. No.: 19/178,684

(22) Filed: Apr. 14, 2025

(65) Prior Publication Data

US 2025/0349035 A1 Nov. 13, 2025

Related U.S. Application Data

(60) Provisional application No. 63/646,434, filed on May 13, 2024.

(51) Int. Cl.
*G06K 9/36* (2006.01)
*G06T 9/00* (2006.01)
*H04N 25/773* (2023.01)

(52) U.S. Cl.
CPC ............. *G06T 9/00* (2013.01); *H04N 25/773* (2023.01)

(58) Field of Classification Search
CPC .... G06V 20/20; G06V 20/56; G02B 27/0181; G02B 27/646; G02B 30/34; G06T 9/00;
(Continued)

(56) References Cited

U.S. PATENT DOCUMENTS

2009/0202254 A1 8/2009 Majumdar et al.
2016/0349509 A1 12/2016 Lanier et al.
(Continued)

FOREIGN PATENT DOCUMENTS

CN 110297325 A 10/2019
JP 2000271342 A 10/2000
(Continued)

OTHER PUBLICATIONS

Invitation to Pay Additional fees for PCT Application No. PCT/US2025/029037, by Rivet Industries, Inc., mailed Oct. 6, 2025; 11 pages.

(Continued)

*Primary Examiner* — Duy M Dang
(74) *Attorney, Agent, or Firm* — COOLEY LLP

(57) ABSTRACT

An apparatus can comprise an image encoder and a location encoder. The image encoder can be configured to be trained using a plurality of images including at least one image captured by a visible sensor and at least one image captured by a thermal camera. Further, the image encoder can be configured to output image encoder values based on the plurality of images. The location encoder can be configured to be trained using a plurality of location pairs, the location encoder configured to output location encoder values, each location pair from the plurality of location pairs uniquely associated with at least one image from the plurality of images. Further, the image encoder values and the location encoder values can collectively define a shared latent space.

20 Claims, 6 Drawing Sheets

(58) Field of Classification Search
CPC .. G06T 9/02; G06T 9/04; G06T 7/292; G06T 7/20; G06T 5/50; G06T 5/60; G06T 5/80; G06T 7/285; G06T 2207/10032; G06T 2207/10036; G06T 2207/10048; G06T 2207/30244; G06T 2207/30248; G06T 2207/30252; G06T 2207/30256; H04N 19/43; H04N 19/51; H04N 25/773; G01C 21/3811; G05D 1/0044
See application file for complete search history.

(56) References Cited

U.S. PATENT DOCUMENTS

| | | | |
|---|---|---|---|
| 2020/0041276 A1 | 2/2020 | Chakravarty et al. | |
| 2021/0133932 A1* | 5/2021 | Lee | G06T 5/70 |
| 2021/0264213 A1 | 8/2021 | Pandey et al. | |
| 2022/0189109 A1* | 6/2022 | Panteleev | G06T 15/506 |
| 2022/0319047 A1 | 10/2022 | Urtasun et al. | |
| 2023/0130478 A1* | 4/2023 | Zhang | G06T 7/593 382/106 |
| 2024/0040250 A1 | 2/2024 | Shi et al. | |
| 2025/0348133 A1 | 11/2025 | Jadidian et al. | |

FOREIGN PATENT DOCUMENTS

| | | |
|---|---|---|
| WO | WO-2025240388 A2 | 11/2025 |
| WO | WO-2025240400 A2 | 11/2025 |
| WO | WO-2025255410 A1 | 12/2025 |

OTHER PUBLICATIONS

Dabiri et al., "Modulating Retroreflector Based Free Space Optical Link for UAV-to-Ground Communications," IEEE Transactions on Wireless Communications, (Epub Apr. 27, 2022; Oct. 2022), 21(10):8631-8645.

PCT Application No. PCT/US2025/029037, International Search Report and Written Opinion mailed Nov. 27, 2025, Applicant: Rivet Industries, Inc., 17 pages.

* cited by examiner

500

METHODS AND APPARATUS FOR OPERATION AND NAVIGATION OF AGENTS IN GLOBAL POSITIONING SYSTEM (GPS) DENIED ENVIRONMENTS

CROSS REFERENCE TO RELATED APPLICATION

This application claims priority to U.S. Provisional Patent Application No. 63/646,434, filed May 13, 2024, and titled "METHODS AND APPARATUS FOR OPERATION AND NAVIGATION OF AGENTS IN GLOBAL POSITIONING SYSTEM (GPS) DENIED ENVIRONMENTS," the contents of which are incorporated by reference herein in its entirety.

FIELD

The present disclosure relates to field of operation and navigation of agents in global position system (GPS) denied environment.

BACKGROUND

It is often desirable for mobile computer-based systems to determine their locations for example, through the use of Global Positioning System (GPS). Sometimes, however, the mobile systems to operate and navigate without using GPS.

SUMMARY

In one or more embodiments, an apparatus comprises an image encoder and a location encoder. The image encoder can be configured to be trained using a plurality of images including at least one image captured by a visible sensor and at least one image captured by a thermal camera. Further, the image encoder can be configured to output image encoder values based on the plurality of images. The location encoder can be configured to be trained using a plurality of location pairs, the location encoder configured to output location encoder values, each location pair from the plurality of location pairs uniquely associated with at least one image from the plurality of images. Further, the image encoder values and the location encoder values can collectively define a shared latent space.

In one or more embodiments, an apparatus comprises an image encoder and a location decoder. The image encoder can be configured to receive an input image. Further, the image encoder can be configured to output an image encoder output based on the received input image. The location decoder can be configured to receive as input the image encoder output. Further, the location decoder can be configured to output a coarse location pair based on the image encoder output. The coarse location pair can be indicative of an unknown location pair associated with the input image.

In one or more embodiments, an apparatus comprises a processor and a memory coupled to the processor. The memory can store a machine learning model, a multimodal model, and a fine-tuning module. The machine learning model can be configured to receive at least one input image. Further, the machine learning model can be configured to output a first location pair associated with the at least one input image and a first location indication of the apparatus. The multimodal model can be configured to receive the first location pair from the machine learning model, the at least one input image, and sensor data from at least one sensor different. Further, the multimodal model can be configured to output a second location pair associated with a second location indication of the apparatus. The fine-tuning module can be configured to receive the first location pair from the machine learning model and the second location pair from the multimodal model. Further, the fine-tuning module can be configured to output a third location pair associated with a third location indication of the apparatus based on the first location pair and the second location pair. The third location pair can have an accuracy greater than an accuracy of the first location pair and an accuracy of the second location pair.

DETAILED DESCRIPTION

As mentioned above, the disclosure relates to agents (e.g., individuals, robots, drones, vehicles, etc.) self-localizing in environments without access to Global Positioning System (GPS) signals. Further constraints can exist such as for example a limitation on two-way or omnidirectional communications (e.g., the agents can receive communications but are not to send communications), capable of operating in day and night equally well, and receiving operational details (e.g., mission plan) just before the operation (e.g., 30 minutes prior). Given such constraints, it can be desirable for the agents to determine its own location, also referred to herein as self-localization.

Figure 1A:
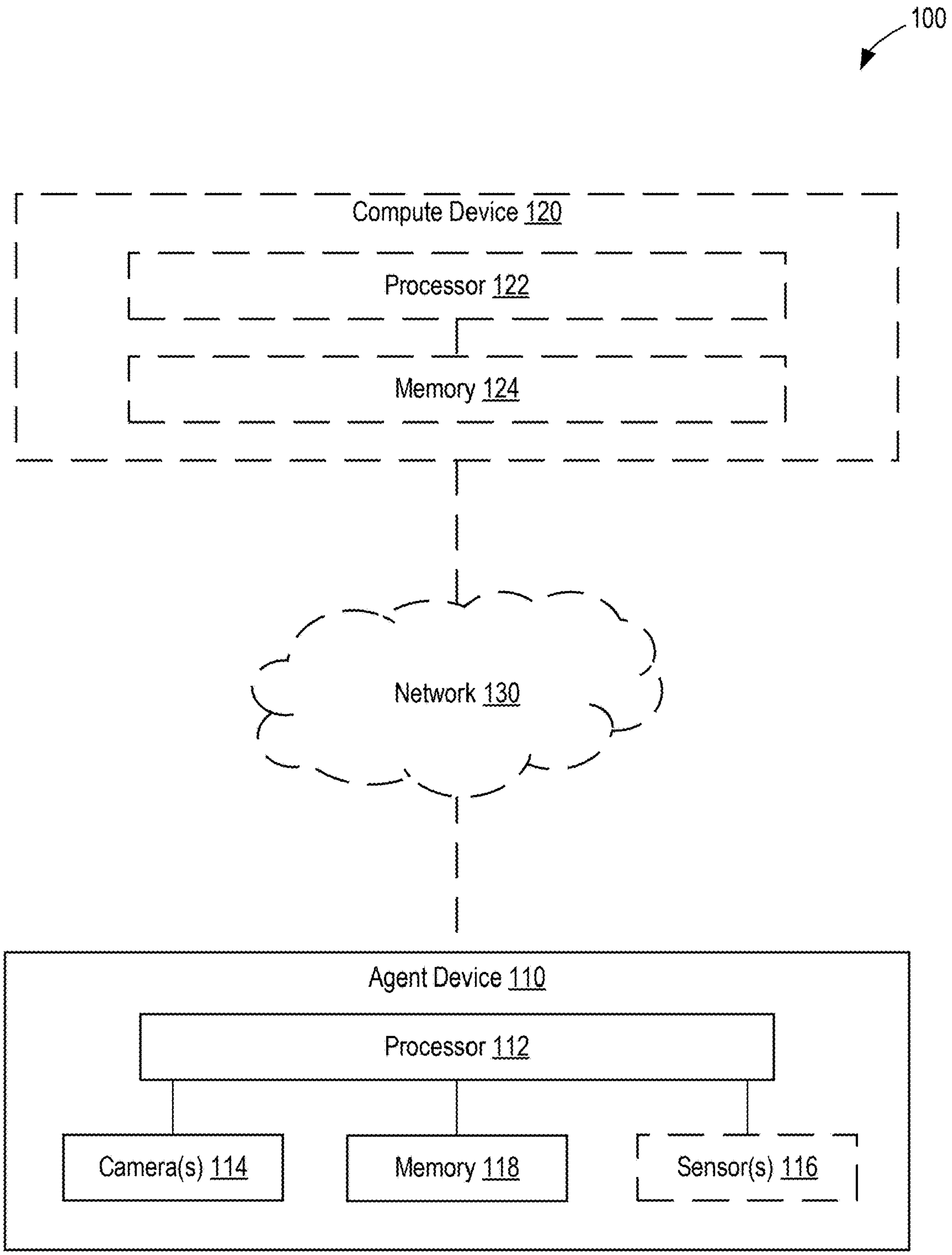
FIG. 1A is a block diagram of a system that includes an agent device, according to an embodiment.

FIG. 1A is a block diagram of a system 100 that includes an agent compute device 110, according to an embodiment. As shown in FIG. 1, the system 100 includes the agent compute device 110 (also referred to herein as "agent device"). The agent device 110 can include a processor 112, camera(s) 114, and a memory 118. Optionally, the agent device 110 can include sensor(s) 116. Optionally, the system 100 can include a compute device 120 and a communications network 130 coupling the compute device 120 and the agent device 110. Optionally, the compute device 120 can include a processor 122 and a memory 124.

The processor 112 can be coupled to the memory 118, the sensors 116, and the cameras 114. The processor 112 (e.g., a central processing unit (CPU), a graphics processing unit (GPU), and/or the like) can be, for example, a hardware-based integrated circuit (IC) or any other suitable processing device configured to run or execute a set of instructions or codes. The memory 118 (e.g., a random-access memory (RAM), a hard drive, a flash drive, and/or the like) of the agent device 110 can store data, and/or code that includes instructions to cause the processor 112 to perform one or more processes or functions. As described in detail in connection with at least FIG. 1B, the memory 118 can store model(s) (e.g., machine learning (ML) models, multimodal models, transformer-based foundation models, etc.) to enable the processor 112 to localize (e.g., self-localize) the agent device 110. The agent device 110 can include a communication interface (e.g., a network interface card (NIC), a Wi-Fi® transceiver, a Bluetooth® transceiver, and/or the like) that can be a hardware component to facilitate data communication between agent device 110 and other devices (e.g., the compute device 120, compute devices coupled to communications network 130 but not shown in FIG. 1, and/or the like). The sensors 116 can include, for example, at least one of an inertial measurement unit (IMU), an accelerometer, a gyroscope, a WiFi® sensor (or a WiFi® transceiver or a WiFi® receiver), a radar sensor, a magnetometer, a temperature sensor, a vehicular sensor, or a long-range unmanned aerial vehicle (UAV) sensor. The cameras 114 can include, for example, at least one of a red-green-blue (RGB) camera, a low light camera, a thermal imager, or a Single Photon Avalanche Diode (SPAD) camera.

The memory 124, the processor 122 and a communications interface (not shown) of compute device 120 can be similar to the memory 118, the processor 112 and the communications interface (not shown) of agent device 110. The memory 124 can include models similar to the models stored in the memory 118 of the agent device 110. The compute device 120 can train at least one of the models and, once the at least one model is trained, it can be sent to agent device 110 and stored in the memory 118 for later use in the inference phase. In alternative implementations, the compute device 120 is optional and the at least one model can be stored at the memory 118 of the agent device 110 for use in both the training phase and inference phase.

The communications network 130 can be any suitable communications network for transferring data, operating over public and/or private communications networks. For example, the communications network 130 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communications network 130 can be a wireless network such as, for example, a Wi-Fi or wireless local area network ("WLAN"), a wireless wide area network ("WWAN"), and/or a cellular network. In other instances, the communications network 130 can be a wired network such as, for example, an Ethernet network, a digital subscription line ("DSL") network, a broadband network, and/or a fiber-optic network. The communications sent via the communications network 130 can be encrypted or unencrypted. In some instances, the communications network 130 can include multiple networks or subnetworks operatively coupled to one another by, for example, network bridges, routers, switches, gateways and/or the like.

Figure 1B:
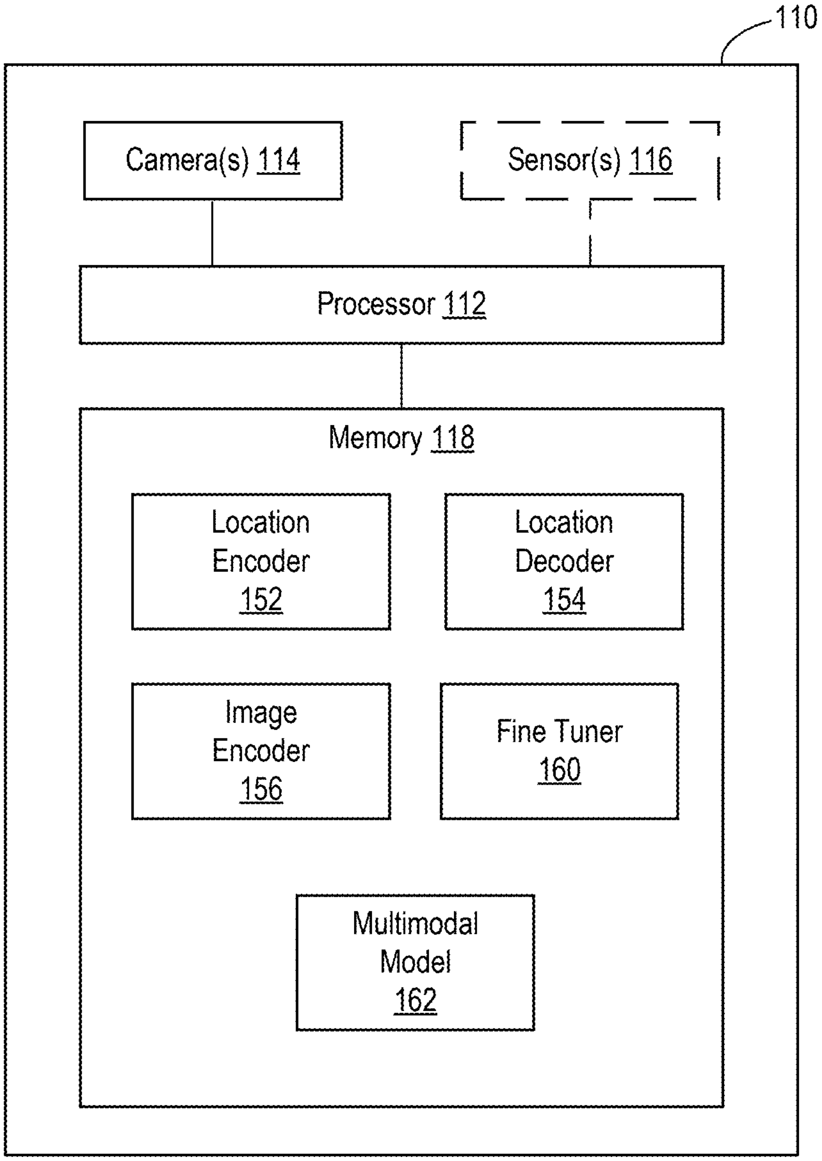
FIG. 1B is a block diagram of the agent device of FIG. 1A including models, according to an embodiment.

FIG. 1B is a block diagram of the agent device 110 of FIG. 1A including models to enable the agent device 110 to self-localize, according to an embodiment. The models can include, for example, a location encoder 152, a location decoder 154, an image encoder 156, a fine tuner 160, and a multimodal model 162. In some implementations, at least one of the location encoder 152, the location decoder 154, or the image encoder 156 are included within a machine learning (ML) model (not shown). In some implementations, the ML model is a transformer-based model. In some implementations, the multimodal model 162 is a simultaneous localization and mapping (SLAM) model.

Figure 2A:
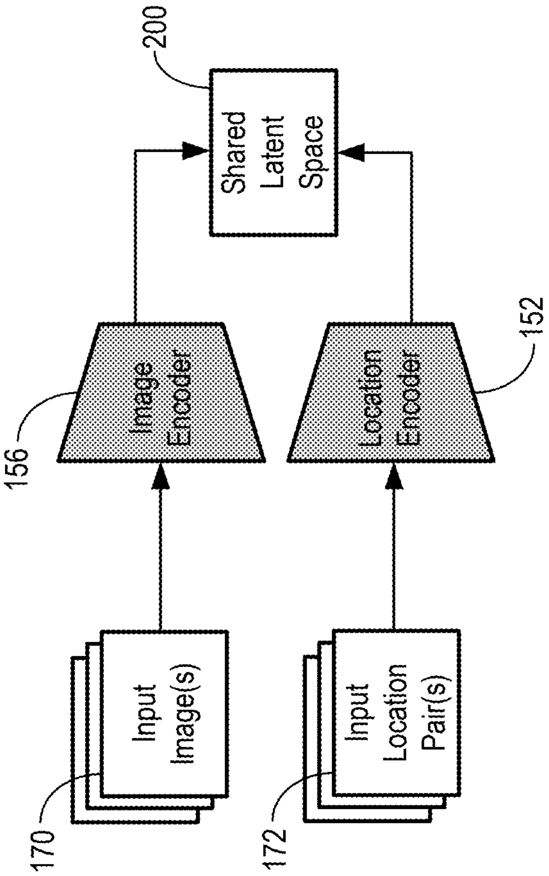
FIG. 2A is a block diagram of a training phase of at least some of the models of FIG. 1B, according to an embodiment.

In some embodiments, the image encoder 156 and the location encoder 152 are trained based on a plurality of input images (e.g., from the cameras 114) and a plurality of location pairs, respectively, as described in detail in connection with at least FIGS. 2A and 4. Although embodiments disclosed herein include the image encoder 156, other encoders may be used to generate output encoder values to enable or aid the agent device 110 to self-localize. For example, a WiFi® encoder (e.g., trained by a plurality of WiFi® inputs) can be included in the memory 118, a text encoder (e.g., trained by a plurality of text inputs) can be included in the memory 118, a video encoder (e.g., trained by a plurality of video inputs) can be included in the memory 118, an audio encoder (e.g., trained by a plurality of audio inputs) can be included in the memory 118, etc. In some implementations, the location decoder 154 is configured to receive output encoder values (e.g., output image encoder values from the image encoder 156) to generate at least one coarse location pair, as described in detail in connection with at least FIGS. 2B, 3, and 5. In some implementations, the fine tuner 160 is configured to generate an output location pair based on the coarse location pair and output from the multimodal model 162, as described in detail in connection with at least FIGS. 3 and 5. In implementations described herein, the agent device 110 is configured to execute instructions stored in the memory 118 to output at least one location pair associated with a location (e.g., approximate location, estimated location, accurate location, etc.) of the agent device 110 such that the agent device 110 can self-localize. For example, the at least one location pair can include an approximate latitude and an approximate longitude associated with a position of the agent device 110 on or above Earth. While the embodiments described herein are described as providing a location pair, it can be appreciated that the agent device 110 can be configured to execute instructions stored in the memory 118 to output other location information, identifiers, features, etc., to enable the agent device 110 to self-localize. For example, the agent device 110 can be configured to execute instructions stored in the memory 118 to output a zip code, a landmark name, a building name, an address, a city, a terrain, a street name, etc., indicative of a position of the agent device 110 on or above Earth to enable or aid the agent device 110 in self-localization. Alternatively, the agent device 110 can be configured to execute instructions stored in the memory 118 to output at least one of the latitude or longitude of a position of the agent device 110 on or above Earth. In some implementations, the agent device 110 can be configured to execute instructions stored in the memory 118 to output an elevation of the agent device 110 relative to a surface of the Earth.

Figure 4:
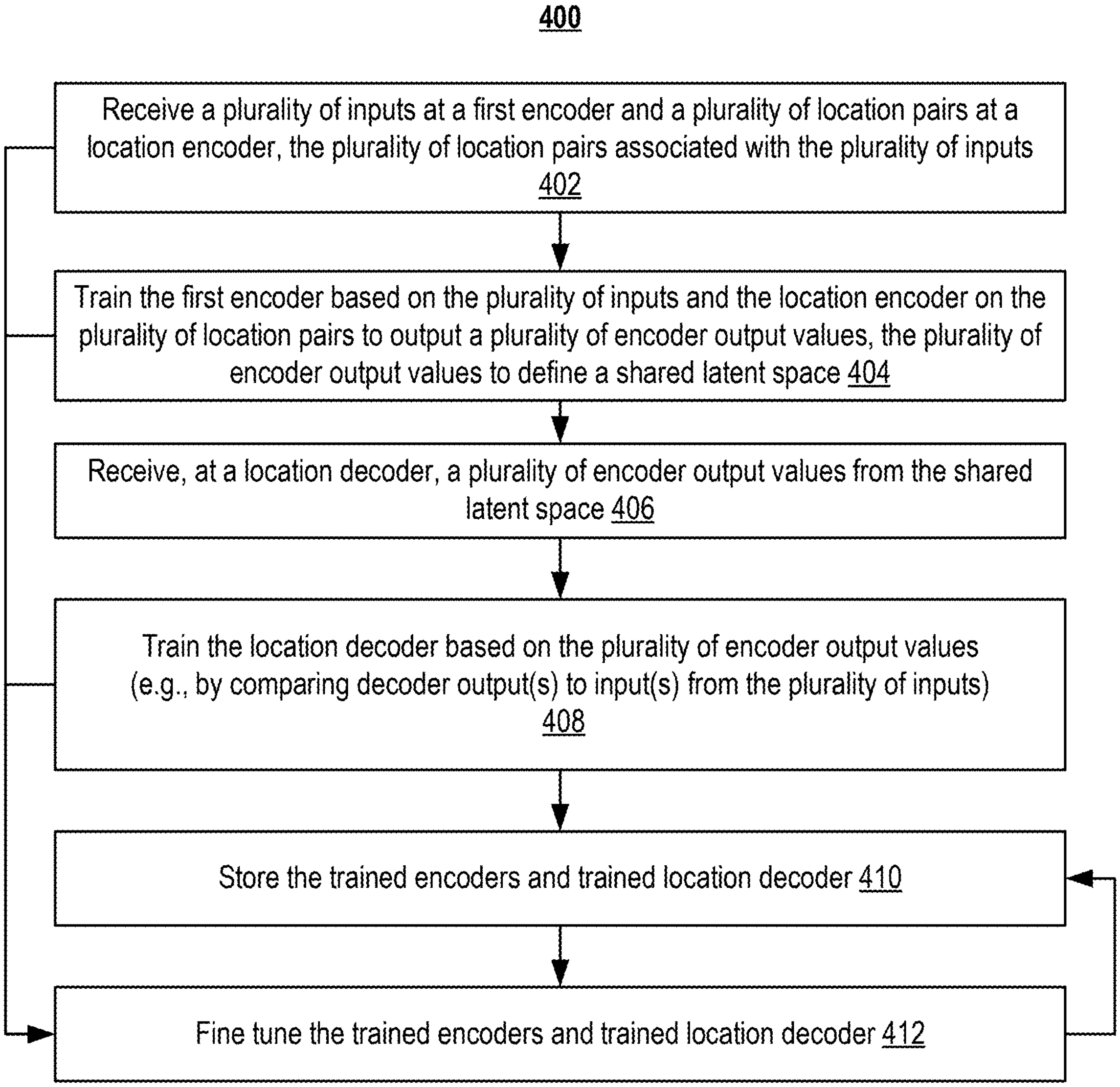
FIG. 4 illustrates a flowchart of a method associated with a training phase of the model(s) described herein, according to an embodiment.

Referring now to FIG. 4, FIG. 4 depicts a flowchart of an example method 400 of training an encoder and a location decoder, according to an embodiment. For example, the method 400 can be implemented to train the image encoder 156, the location encoder 152, and the location decoder 154 of FIG. 1B. For illustrative purposes, the method 400 of FIG. 4 is described in connection with FIG. 2A.

At block 402, a plurality of inputs is received at a first encoder and a plurality of input location pairs is received at a location encoder, the plurality of location pairs associated with the plurality of inputs. As shown in FIG. 2A, input images 170 can be received at the image encoder 156 and input location pairs 172 can be received at the location encoder 152. In some implementations, the image encoder 156 is configured to receive the input image 170 from the cameras 114. In some implementations, the input images 170 include at least one image captured by a visible sensor and at least one image captured by a thermal camera. In some implementations, the input images 170 collectively form a set of videos having continuity across adjacent videos from the set of videos. In some implementations, the location encoder 152 is configured to receive the input location pairs 172 from a GPS and/or the compute device 120 during a training phase. Alternatively, the location encoder 152 can be limited or prevented from receiving GPS transmissions (e.g., from the GPS and/or the compute device 120) during an inference phase, as described in detail in connection with at least FIGS. 2B, 3, and 5. Each one of the input location pairs 172 can be uniquely associated with at least one image from the input images 170. As such, a location (e.g., GPS location) of each of the input images 170 can be a known location.

At block 404, the first encoder is trained based on the plurality of inputs and the location encoder is trained based on the plurality of location pairs to output a plurality of encoder output values, the plurality of encoder output values defines a shared latent space. In reference to FIG. 2A, the image encoder 156 can be configured to output image encoder values based on the input images 170. For example, the image encoder 156 can output image encoder values that represent features (e.g., buildings, geography, terrain, etc.) captured in the input images 170. Further, the location encoder 152 can be configured to output location encoder values based on the input location pairs 172. For example, the location encoder 152 can be a neural network (NN) that encodes GPS coordinates (e.g., latitude and longitude) into vectors or tensors. Thus, the location encoder values can at least partially represent GPS locations/transmissions. The output location encoder values and the output image encoder values can collectively define a shared latent space 200. Each of the output location encoder values can be uniquely associated with at least one of the output image encoder values (e.g., based on each one of the input location pairs 172 being uniquely associated with at least one image from the input images 170).

At block 406, a plurality of encoder output values are received at a location decoder from the shared latent space. For example, the output location encoder values and/or the output image encoder values can be received at the location decoder 154 (not shown in FIG. 2A) from the shared latent space 200. At block 408, the location decoder is trained based on the plurality of encoder output values. For example, the location decoder 154 is trained based on the output location encoder values and/or the output image encoder values. In some implementations, the location decoder 154 is trained by comparing location decoder outputs (generated based on the image encoder output values) to the input location pairs 172.

At block 410, the trained encoders and trained location decoder are stored. For example, the trained image encoder 156, the trained location encoder 152, and the trained location decoder 154 are stored in the memory 118 (see FIGS. 1A and 1B). At block 412, the trained encoders and the trained location decoder are fine tuned. For example, the fine tuner 160 (not shown in FIG. 2A; see FIGS. 1A and 1B) can fine tune the trained image encoder 156, the trained location encoder 152, and the trained location decoder 154. In some embodiments, the fine tuner 160 can perform a fine tuning process when, for example, the input images 170 are updated/replaced, the input location pairs 172 are updated/replaced, etc.

Figure 2B:
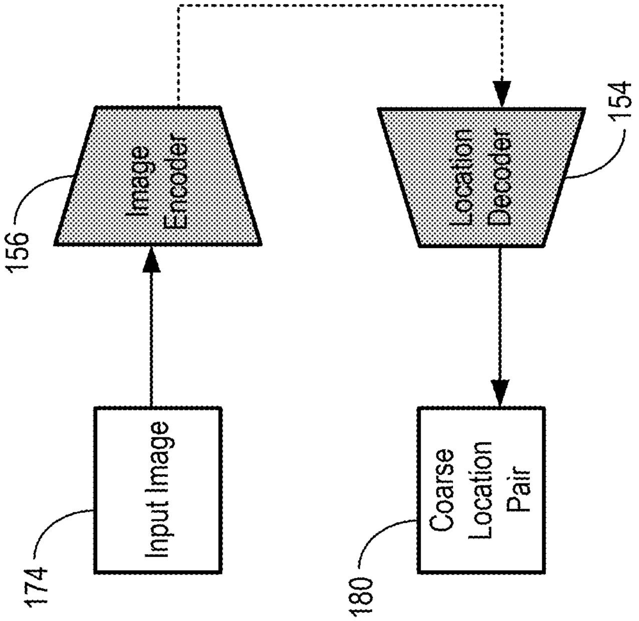
FIG. 2B is a block diagram of an inference phase of at least some of the models of FIG. 1B, according to an embodiment.

FIG. 2B illustrates an inference phase associated with the image encoder 156 and the location decoder 154 to determine a coarse location of the agent device 110. The image encoder 156 can be configured to receive an input image 174 from the cameras 114 (see FIGS. 1A and 1B). Because on the agent device 110 has an unknown location (e.g., hence the initiation of the self-localization process), the input image 174 has an unknown location at the start of the inference phase. The input image 174, however, can include or depict features (e.g., buildings, terrain, landmarks, etc.) indicative of the surroundings of the agent device 110 and, thus, indicative of a location of the agent device 110. The image encoder 156 aids in the process of self-localization by generating image output encoder values based on the input image 174 (e.g., based on features captured in the input image 174). In some implementations, the image encoder 156 outputs the image output encoder values to the shared latent space 200 (see FIG. 2A). In turn, the location decoder 154 can receive the image output encoder values (e.g., from the shared latent space 200) to generate a coarse location pair 180. In some implementations, the coarse location pair 180 is generated based on the image output encoder values associated with the input image 174. The coarse location pair 180 can be indicative of the unknown location pair associated with the input image 174. As such, the location decoder 154 can provide a guess or estimate of a location of the agent device 110 based on features in the input image 174 captured by cameras 114 from the agent device 110. Further, the agent device 110 is limited or prevented from accessing the network 130 (see FIG. 1A) such that location decoder 154 is limited or prevented from accessing GPS transmissions. As such, the location decoder 154 can be configured to output the coarse location pair 180 without accessing GPS transmissions (e.g., to maintain a stealth mode of the agent device 110 such that transmissions or other confidential information is safeguarded from intercepts). In some implementations, a difference between the coarse location pair 180 and the actual unknown location of the agent device 110 can be about 1 kilometer (km).

Figure 3:
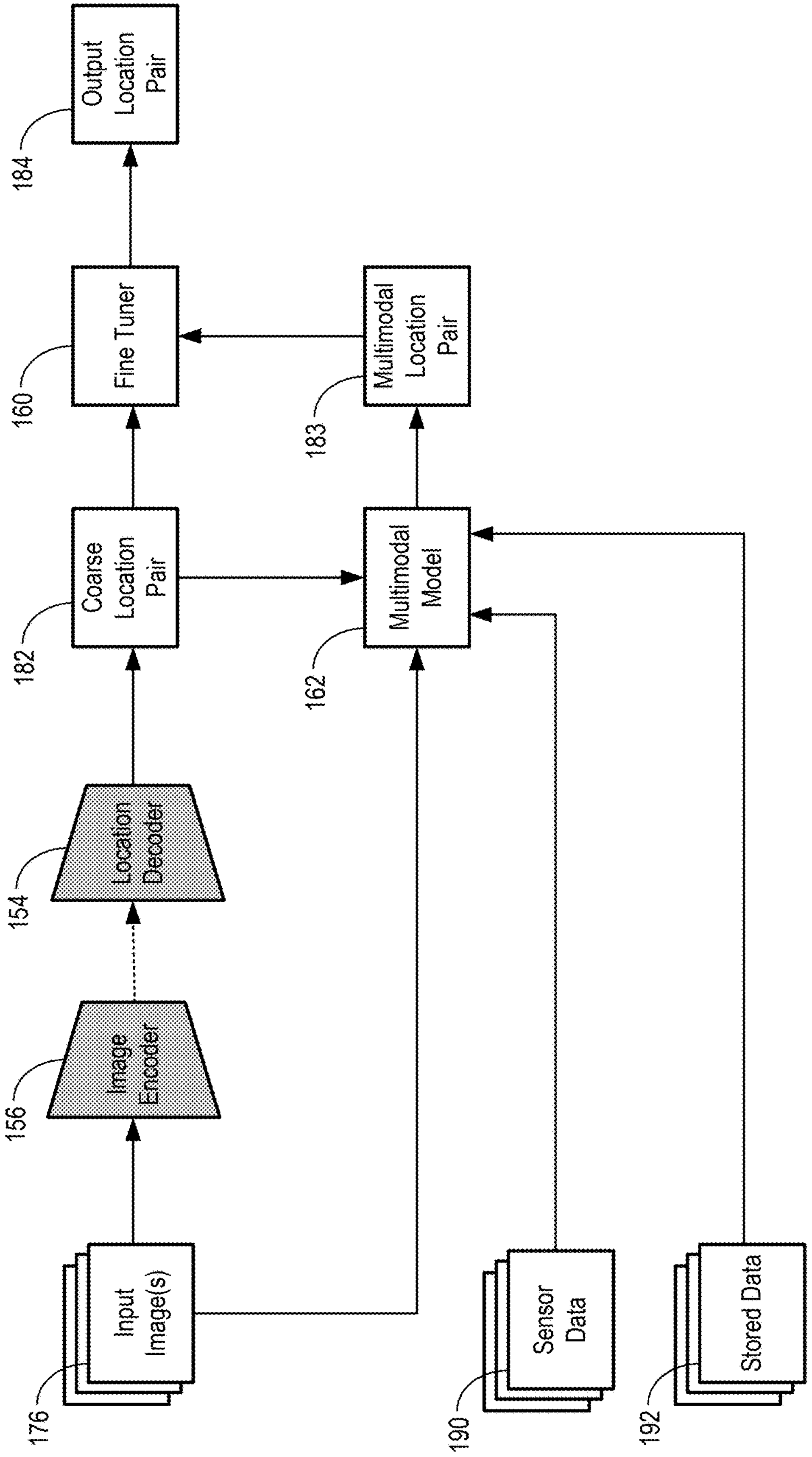
FIG. 3 is a block diagram of another inference phase of the models of FIG. 1B, according to an embodiment.
Figure 5:
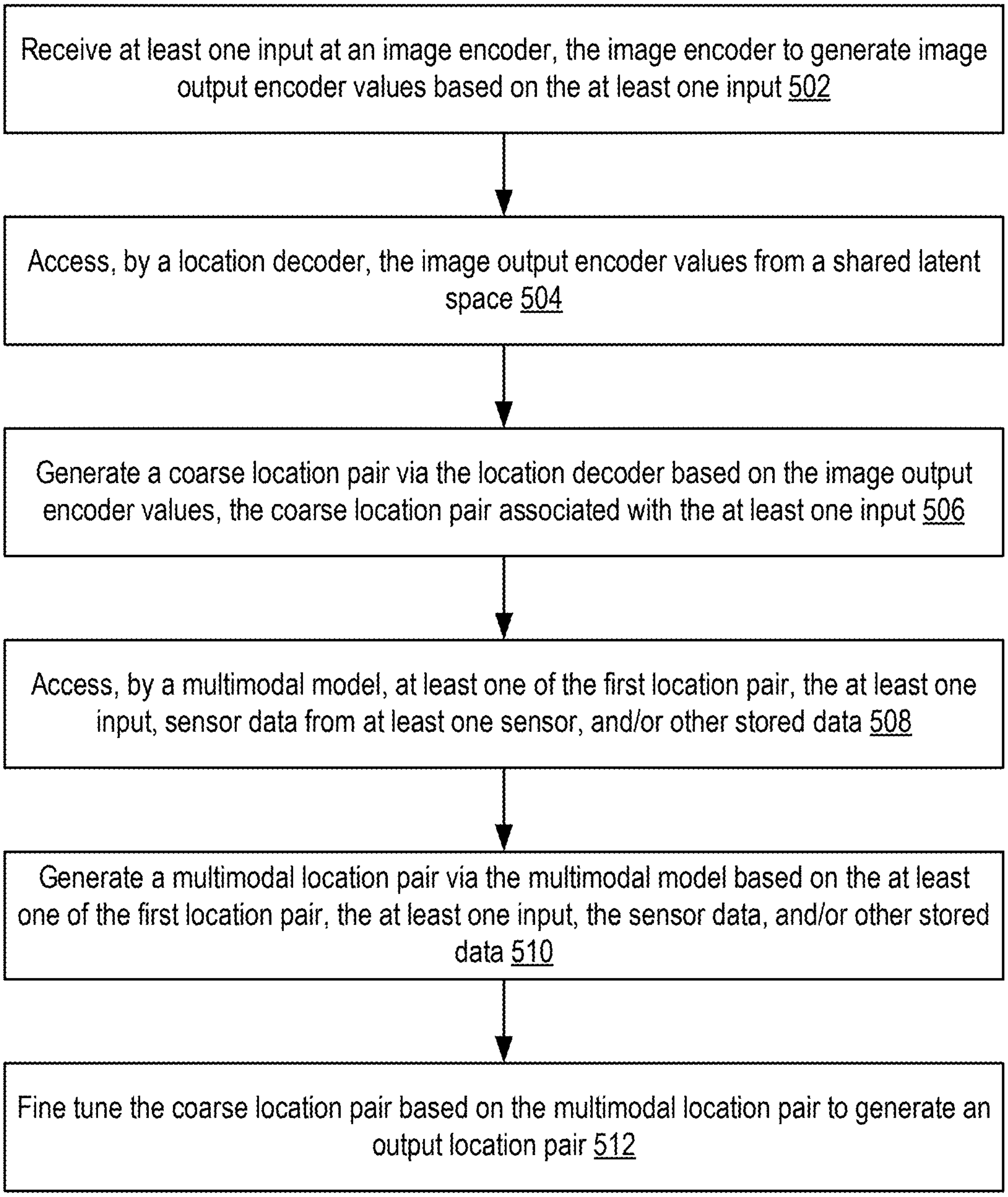
FIG. 5 illustrates a flowchart of a method associated with an inference phase of the model(s) described herein.

Referring now to FIG. 5, FIG. 5 depicts a flowchart of an example method 500 of an inference phase of the system 100. For illustrative purposes, the method 500 of FIG. 5 is described in connection with FIG. 3. At block 502, at least one input is received at an image encoder, the image encoder to generate image output encoder values based on the at least one input. As shown in FIG. 3, input images 176 are received at the image encoder 156. The image encoder 156 can be configured to generate image output encoder values (e.g., to the shared latent space 200) based on the input images 176.

At block 504, the image output encoder values can be accessed by a location decoder from a shared latent space. As shown in FIG. 3, the image output encoder values can be accessed by the location decoder 154 from the shared latent space 200 (not shown). At block 506, a coarse location pair is generated via the location decoder based on the image output encoder values, the coarse location pair associated with the at least one input. As shown in FIG. 3, a coarse location pair 182 is generated via the location decoder 154 based on the image output encoder values. The coarse location pair 182 can be associated with at least one of the input images 176. In some implementations, the coarse location pair 182 is associated with an entirety of the input images 176 (e.g., when the cameras 114 capture a plurality of images or a video of the surroundings of the agent device 110). The coarse location pair 182 can be a first/preliminary location indication of the agent device 110.

At block 508, at least one of the coarse location pair, the at least one input, sensor data from at least one sensor, and/or other stored data is accessed by a multimodal model. As shown in FIG. 3, the multimodal model 162 can access at least one of the coarse location pair 182, at least one of the input images 176, sensor data 190 from at least one of the sensors 116 (not shown), and/or other stored data 192. In some implementations, the sensor data 190 can include, for example, an acceleration of the agent device 110, a deceleration of the agent device 110, a temperature of the agent device 110, a temperature of the surroundings of the agent device 110, WiFi® data, and/or etc. In some implementations, the sensor data 190 are processed by a Kalman filter algorithm such that the sensor data 190 includes little to no noise. In some implementations, the stored data 192 includes the sensor data 190 and/or other data associated with the agent device 110. For example, the stored data 192 can include reference location information associated with the agent device 110.

In some implementations, the reference location information includes a last known location associated with the agent device 110. Additionally or alternatively, the reference location information includes a reference location pair received by the agent device 110 from the compute device 120 (e.g., prior to limiting transmissions of the agent device 110 from/to the network 130). Further, the reference location information can include an expected location pair based on an expected location of the agent device 110 (e.g., based on a mission/task/drop off location associated with the agent and/or the agent device 110). In some embodiments, at least one of the sensor data 190 or the stored data 192 is stored in the memory 118 of the agent device 110 (see FIGS. 1A and 1B). Alternatively, the multimodal model 162 can be configured to communicatively coupled to the sensors 116 such that the multimodal model 162 is configured to receive a data stream (e.g., live, continuous data stream) from the sensors 116.

At block 510, a multimodal location pair is generated by the multimodal model based on the at least one of the coarse location pair, the at least one input, the sensor data, and/or the other stored data. For example, the multimodal model 162 can be configured to generate a multimodal location pair 183 based on the at least one of the coarse location pair 182, the at least one of the input images 176, the sensor data 190, or the stored data 192. The multimodal location pair 183 can be a second location indication of the agent device 110. In some implementations, the multimodal location pair 183 is more accurate than the coarse location pair 182. In some implementations, the multimodal model 162 is further configured to verify the multimodal location pair 183 by (i) receiving the reference location information (e.g., a last known location pair associated with the agent device 110, an expected location pair associated with the agent device 110, etc.) and (ii) determining that a distance between the coarse location pair 182 and the reference location information satisfies a threshold distance.

In some implementations, the multimodal model 162 is configured to determine the threshold distance based on a speed capacity (e.g., maximum speed) of the agent device 110 (e.g., an agent or vehicle associated with the agent device 110) and a timestamp associated with when the input images 174 were captured. In other words, a maximum speed of the agent device 110 can indicate a maximum distance (e.g., radius) within which the agent device 110 would be able to travel in a time span between the last known location pair and capture of the input images 174. The multimodal model 162 can determine that the multimodal location pair 183 is an unverified location of the agent device 110 if a difference between the multimodal location pair 183 and the last known location pair exceeds or is outside of the threshold distance. Alternatively, the multimodal model 162 can determine that the multimodal location pair 183 is a verified location of the agent device 110 if a distance between the multimodal location pair 183 and the last known location pair is within the threshold distance.

At block 512, the coarse location pair is fine tuned based on the multimodal location pair to generate an output location pair. As shown in FIG. 3, the fine tuner 160 is configured to fine tune the coarse location pair 182 based on the multimodal location pair 183 to generate an output location pair 184. In some implementations, the output location pair 184 is a third location indication of the agent device 110. In some implementations, the output location pair 184 has an accuracy greater than an accuracy of the coarse location pair 182 and an accuracy of the multimodal location pair 183.

In some implementations, the fine tuner 160 receives as input an off-line map of the area where the agent device 110 is located to verify the output location pair 184. For example, the memory 118 of the agent device 110 can store a plurality of off-line maps corresponding to various locations (e.g., in a city, in a region, in the world, etc.). The fine-tuning module 160 can receive as input an off-line map associated with, for example, the last known location of the agent device 110. In turn, the fine-tuning module 160 can compare the output location pair 184 to the off-line map to verify that the output location pair 184 is included in or nearby locations associated with the off-line map. In some embodiments, the fine-tuning module 160 can adjust, tune, or refine the output location pair 184 based on such a comparison to the off-line map.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:

an image encoder configured to be trained using a plurality of images including at least one image captured by a visible sensor and at least one image captured by a thermal camera, the image encoder configured to output image encoder values based on the plurality of images; and a location encoder configured to be trained using a plurality of location pairs, the location encoder configured to output location encoder values, each location pair from the plurality of location pairs uniquely associated with at least one image from the plurality of images, the image encoder values and the location encoder values collectively defining a shared latent space, the location encoder values at least partially representing Global Positioning System (GPS) locations.

2. The apparatus of claim 1, further comprising:

a location decoder configured to be trained using the shared latent space, the location decoder configured to output a coarse location pair indicative of an unknown location pair associated with an input image.

3. The apparatus of claim 1, wherein the image encoder and the location encoder are included within a machine learning model.

4. The apparatus of claim 1, wherein the plurality of images collectively form a set of videos having continuity across adjacent videos from the set of videos.

5. The apparatus of claim 1, wherein the location encoder is configured to receive the plurality of location pairs from GPS transmissions.

6. An apparatus, comprising:

an image encoder operatively coupled to a compute device and configured to receive an input image, the image encoder configured to output an image encoder output based on the received input image; and a location decoder operatively coupled to a compute device and configured to receive as input the image encoder output, the location decoder configured to output a coarse location pair based on the image encoder output, the coarse location pair indicative of a location of the compute device.

7. The apparatus of claim 6, wherein a difference between the coarse location pair and the location of the compute device is about 1 kilometer (km).

8. The apparatus of claim 6, wherein the location decoder is configured to output the coarse location pair without accessing Global Positioning System (GPS) transmissions.

9. The apparatus of claim 6, wherein the input image is received from at least one of a visible camera or a thermal camera.

10. The apparatus of claim 6, wherein the input image is at least one of a visible image, a Single Photon Avalanche Diode (SPAD) image, or a thermal image.

11. An apparatus, comprising:

a processor; and a memory coupled to the processor, the memory storing a machine learning model, a multimodal model and a fine-tuning module, the machine learning model configured to receive at least one input image, the machine learning model configured to output a first location pair associated with the at least one input image and a first location indication of the apparatus, the multimodal model configured to receive the first location pair from the machine learning model, the at least one input image, and sensor data from at least one sensor, the multimodal model configured to output a second location pair associated with a second location indication of the apparatus, and the fine-tuning module configured to receive the first location pair from the machine learning model and the second location pair from the multimodal model, the fine-tuning module configured to output a third location pair associated with a third location indication of the apparatus based on the first location pair and the second location pair, the third location pair having an accuracy greater than an accuracy of the first location pair and an accuracy of the second location pair.

12. The apparatus of claim 11, wherein the multimodal model is further configured to verify the second location pair by:

receiving reference location information associated with the apparatus, and determining that a distance between the first location pair and the reference location information satisfies a threshold distance.

13. The apparatus of claim 12, wherein the reference location information is associated with a last known location pair of the apparatus.

14. The apparatus of claim 12, wherein the multimodal model is further configured to determine the threshold distance based on a speed capacity associated with the apparatus and a timestamp associated with when the at least one input image was captured.

15. The apparatus of claim 11, wherein the at least one sensor includes at least one of an inertial measurement unit (IMU), a magnetometer, a WiFi® sensor or a radar sensor.

16. The apparatus of claim 11, wherein the multimodal model is a simultaneous localization and mapping (SLAM) model.

17. The apparatus of claim 11, wherein the machine learning model includes an image encoder and a location decoder, the image encoder configured to receive the at least one input image and output an image encoder output based on the at least one input image, the location decoder configured to receive the image encoder output and output the first location pair based on the image encoder output.

18. The apparatus of claim 11, wherein the machine learning model is trained on an external device different from the apparatus.

19. The apparatus of claim 18, wherein the external device is capable of receiving Global Positioning System (GPS) transmissions and the apparatus is prevented from receiving GPS transmissions.

20. The apparatus of claim 6, wherein the coarse location pair includes a latitude and a longitude.

* * * * *